Patented June 21, 1949

2,474,084

UNITED STATES PATENT OFFICE 2,474,084

SECONDARY AMINES OF 3,3 BIS (P-AMINO-PHENYL) PHTHALIDE

Clyde S. Adams, Yellow Springs, Ohio, assignor to The National Cash Register Company, Dayton, Ohio, a corporation of Maryland No Drawing. Application April 12, 1945, Serial No. 588,077

5 Claims. (Cl. 260—344.6)

This invention relates to normally colorless substances which assume a color under certain conditions, and particularly pertains to the secondary amines of 3,3 bis (p-aminophenyl) phthalide, having the general structure

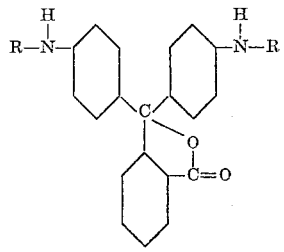

where R is a mono-valent organic radical, and in which NHR is a secondary amine.

The organic radical which R represents may be taken from any one of the following classes, each identified by one or more typical representatives:

Class I, the mono-valent aliphatic hydrocarbon radicals, exemplified by the methyl radical CH₃—).

Class II, the mono-valent aliphatic hydrocarbon radicals having a substituent for one or more hydrogen atoms
   A. As exemplified by the chloromethyl radical (CH₂Cl—);
   B. As exemplified by the benzy radical (C₆H₅CH₂—); or
   C. As exemplified by a sulphobenzyl radical such as (HSO₃C₆H₄CH₂—).

Class III, the mono-valent alicyclic hydrocarbon radicals, exemplified by the cyclopropyl radical

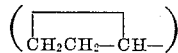

Class IV, the mono-valent alicyclic hydrocarbon radicals having a substituent for one or more of the hydrogen atoms, exemplified by a chlorocyclopropyl radical such as

Class V, the mono-valent aromatic hydrocarbon radicals, exemplified by the phenyl radical (C₆H₅—).

Class VI, the mono-valent aromatic hydrocarbon radicals having a substituent for one or more of the hydrogen atoms, as exemplified by the sulphophenyl radical (HSO₃C₆H₄—).

Class VII, the mono-valent heterocyclic radicals, as exemplified by the pyridyl radical (C₅H₄N—).

Class VIII, the mono-valent heterocyclic radicals having a substituent for one or more of the hydrogen atoms, as exemplified by the methylpyridyl radical (CH₃C₅H₃N—).

The compounds of these classes are colorless or practically colorless in their normal state, but each may be affected so as to cause it to assume a strong blue color by reason of a change in its light-absorbing characteristics. One way of causing the color to appear is to adsorb the compound on a polar substance. Another way of causing the color to appear is to treat the compound with a weak acid.

By "polar substance" is meant a compound whose molecules are electrically asymmetrical. Clay, various silicates, silicon dioxide, magnesium carbonate, calcium carbonate, aluminum phosphate, zinc sulphide, aluminum oxide, calcium chloride, calcium fluoride, and calcium sulphate are representative polar substances of relatively high effectiveness in connection with the novel color-reactant compounds.

Among the weak acids may be mentioned acetic acid and tartaric acid, although diluted stronger acids will do.

The stability of the new compounds in the leuco or colorless state gives them a wide field of usefulness in the art of printing or writing, wherein the color-reactant compound is placed in juxtaposition, but not in adsorption contact, with a polar substance to form a coating for record material. Upon the juxtaposed substances' being brought into intimate contact locally, by impact or scribing pressures, adsorption takes place, producing a strong color. Such coatings for record material made of the color-reactant compounds which are the subject of this invention are stable because the color-reactant compounds are stable to normal environmental conditions in the leuco state and, on the other hand, will persist in the colored state as long as the color-inducing cause persists. Reference is made to the United States patent application Serial No. 784,938, filed November 8, 1947, as a continuation of United States patent application Serial Number 520,573, filed January 31, 1944, by Barrett K. Green, and now abandoned for a complete description of an impact-responsive record material coating of the kind mentioned.

Therefore, among the objects of the invention is to provide a new type of compound comprising the secondary amines of 3,3 bis (p-aminophenyl) phthalide.

Another object of the invention is to provide a new type of compound the member compounds of which are normally colorless and stable but which may be made to assume a color in the presence of a polar substance, in the presence of an acid substance or in the presence of other environmental conditions capable of altering their light-absorbing characteristics.

Another object of the invention is to provide methods for making the new type of substances.

Examples will be given of the process of making several specific ones of these new compounds, from known materials, in a manner which will serve to show how all of the various types of compounds included within the invention may be produced.

Class I compounds may be made by following the general method of making the specific compound 3,3 bis (p-methylaminophenyl) phthalide having the structure

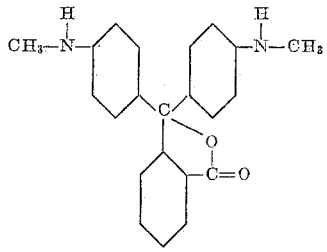

Fifty grams of anhydrous aluminum chloride are dissolved in 250 milliliters of dry nitrobenzene. To the solution are added 20 grams of 3,3 dichlorophthalide and 23 grams of N,N' dimethyl N,N' diphenyl urea, and the mixture is allowed to stand at room temperature for about an hour. The resultant solution is then heated on a steam bath for approximately an hour and thereafter poured onto 1,000 grams of cracked ice which has been acidified with 75 milliliters of hydrochloric acid of approximately 1.18 specific gravity. The resultant mixture is then made up to two liters with water and is steam-distilled to remove most of the nitrobenzene. The residual steam-distilled mixture is cooled and the water is filtered therefrom. The remaining solid condensate mass is then dried and pulverized. 300 milliliters of diethyl ether are added to the pulverized solid mass to extract the last traces of nitrobenzene. After standing for several hours at room temperature, the diethyl ether is decanted, and the solid is air-dried, leaving the intermediate condensation product.

Ten grams of the intermediate condensation product are air-dried, powdered, and introduced into a glass pressure tube of about 160 milliliters' capacity, and 25 milliliters of hydrochloric acid of approximately 1.18 specific gravity are added. The tube is then sealed and heated in a bomb furnace for five hours at 140 degrees to 150 degrees centigrade in order to hydrolize the condensation product. The tube is cooled and opened, and the contents is transferred to a beaker, where it is diluted with 100 milliliters of water and boiled with sufficient activated charcoal to decolorize it. The decolorized mixture is then suction-filtered, and the filtrate is cooled and made slightly alkaline with ammonium hydroxide, which causes a precipitation of the final product in crude form. The precipitate is filtered out and washed with water. Next, the washed precipitate is recrystallized by the use of hot 95% ethyl alcohol, giving the final product, 3,3 bis (p-methylaminophenyl) phthalide.

As another example of class I compounds, the process of making the ethyl type will be described, which has the structure

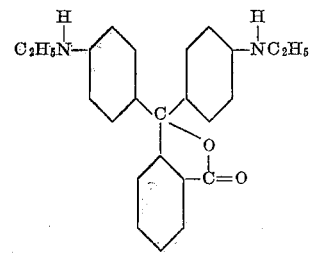

and which is named 3,3 bis (p-ethylaminophenyl) phthalide.

Fifty grams of anhydrous aluminum chloride are dissolved in 250 milliliters of dry nitrobenzene. To this solution are added 20 grams of 3,3 dichlorophthalide and 23 grams of N,N' diethyl N,N' diphenyl urea, and the mixture is allowed to stand at room temperature for about two hours. The resultant solution is then heated on a steam bath for an hour and afterwards is poured onto 1,000 grams of cracked ice which has been acidified with 75 milliliters of hydrochloric acid of approximately 1.18 specific gravity. The resultant mixture is then made up to two liters with water and is steam-distilled to remove most of the nitrobenzene. The residual steam-distilled mixture is cooled, and the water is filtered therefrom. The remaining solid mass is then air-dried and pulverized. 300 milliliters of diethyl ether are added to the pulverized solid mass to extract the last traces of nitrobenzene. After standing at room temperature for several hours, the diethyl ether is decanted and the solid is air-dried, leaving an intermediate condensation product.

Ten grams of the intermediate condensation product are air-dried, powdered, and introduced into a glass pressure tube of about 160 milliliters' capacity, and 25 milliliters of hydrochloric acid of approximately 1.18 specific gravity are added. The tube is then sealed and heated in a bomb furnace for five hours at between 140 degrees and 150 degrees centigrade in order to hydrolize the condensation product. The tube is cooled and opened, and the contents is transferred to a beaker, where it is diluted with 150 milliliters of water and boiled with sufficient activated charcoal to decolorize it. The decolorized mixture is then suction-filtered, and the filtrate is cooled and made slightly alkaline with ammonium hydroxide, which causes the precipitation of the final product in crude form. The precipitate is filtered out and washed with water. Next, the washed precipitate is recrystallized by the use of hot 95% ethyl alcohol, giving the final product, 3,3 bis (p-ethylaminophenyl) phthalide.

The other classes of compounds noted under the headings II, III, IV, V, VI, VII, and VIII may be made in a similar manner by selection of a proper compound of the N,N' diphenyl urea class having the structural formula

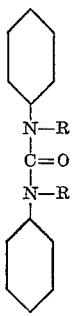

wherein R is a radical chosen from among the hydrocarbon radicals in said classes I to VIII. Two molecules of the selected substituted urea compound are used for every molecule of 3,3 dichlorophthalide. For instance, in making 3,3 bis (p-chloromethylaminophenyl) phthalide, the substituted urea compound N,N' chloromethyl, N,N' diphenyl urea would be used in sufficient quantity so that two molecules of it are available for every one molecule of the 3,3 dichlorophthalide. The same two-for-one proportions of urea compound and 3,3 dichlorophthalide obtain in each instance.

Where the term "3,3 dichlorophthalide" is used, the substance having the following structure is meant:

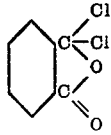

In commercial practice, the material used may be o-phthaloyl chloride in equilibrium association with 3,3 dichlorophthalide. The o-phthaloyl chloride present in the commercial product is converted in the presence of aluminum chloride into 3,3 dichlorophthalide, in which form it condenses with the selected substituted diphenyl urea compound. The following structural relationship exists between the o-phthaloyl chloride and the 3,3 dichlorophthalide:

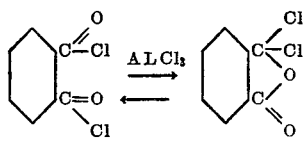

The Eastman compound "phthalyl chloride" is of the type containing the o-phthaloyl chloride and 3,3 dichlorophthalide in equilibrium.

While the forms of several of the compounds have been specifically described, it is to be understood that the invention is not to be limited to such compounds, as such are given as examples of members of the class, and means has been specified whereby other similar compounds in the same classes may be formed.

What is claimed is:
1. The compound of the formula

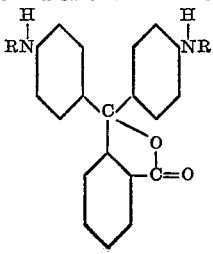

in which NHR is a secondary amine and R is a mono-valent hydrocarbon radical containing not more than 6 carbon atoms when it is a straight chain, not more than 5 carbon atoms when it is a branched chain, and not more than 9 carbon atoms when it contains a cyclic group.

2. The compound of the formula

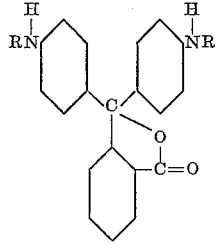

where R is a mono-valent aliphatic hydrocarbon radical containing not more than 6 carbon atoms when it is a straight chain and not more than 5 carbon atoms if it is a branched chain.

3. The compound of the formula

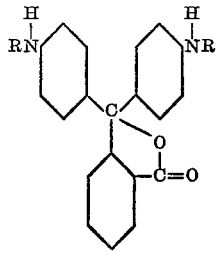

where R is a mono-valent alicyclic hydrocarbon radical containing not more than 5 carbon atoms.

4. The compound of the formula

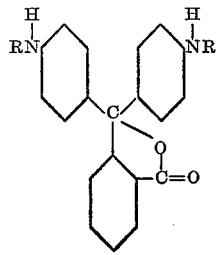

where R is a mono-valent aromatic hydrocarbon radical containing not more than 6 carbon atoms.

5. The secondary amine 3,3 bis (p-methylaminophenyl) phthalide having the structure

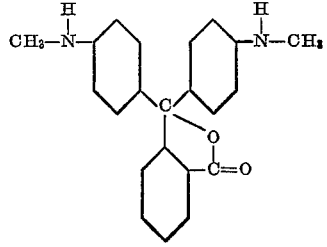

CLYDE S. ADAMS.

REFERENCES CITED

The following references are of record in the file of this patent:

Chemical Abstracts, 32, 1938, page 532, citing Schwarzenback et al., Hev. Chem. Acta 20, pages 1253-60 (1937).

Chemical Abstracts, 32, 1938, page 2106, citing Schwarzenback et al., Helv. Chem. Acta 20 (1937), pages 1591-1600.